W. S. GRIGG.
LUBRICANT RETAINER.
APPLICATION FILED MAY 29, 1918.
1,296,181.
Patented Mar. 4, 1919.
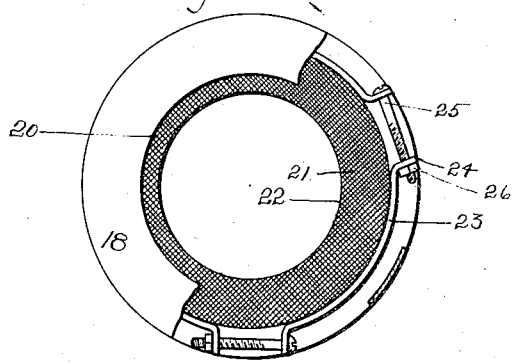
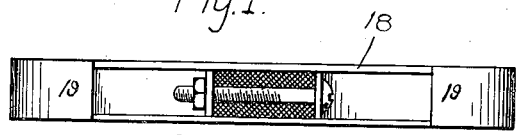
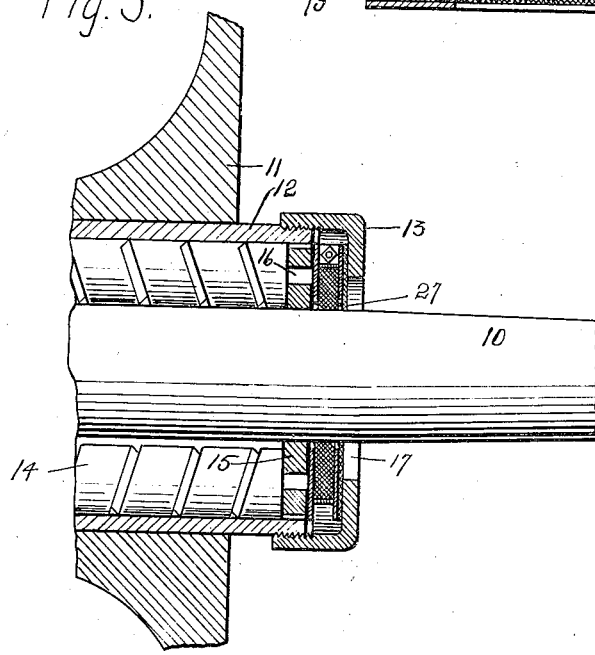
Witness:
Demirjean
Inventor:
W. S. Grigg
By Orwig & Bair
Attorneys.

UNITED STATES PATENT OFFICE.

WILLIAM S. GRIGG, OF PORT HURON, MICHIGAN.

LUBRICANT-RETAINER.

1,296,181.
Specification of Letters Patent.
Patented Mar. 4, 1919.

Application filed May 29, 1918. Serial No. 237,233.

*To all whom it may concern:*

Be it known that I, WILLIAM S. GRIGG, a citizen of the United States, and resident of Port Huron, in the county of St. Clair and State of Michigan, have invented a certain new and useful Lubricant-Retainer, of which the following is a specification.

The object of my invention is to provide a lubricant retainer of simple, durable and inexpensive construction adapted to be mounted upon an axle or shaft for properly retaining the lubricant on the axle.

More particularly it is my object to provide a lubricant retainer in the form of a holder adapted to be mounted upon the axle of a motor vehicle or the like adjacent to the axle housing and consisting of spaced concentric disks having openings therein of greater diameter than the axle with a packing ring of suitable absorbent material arranged between said disks and having an opening of proper size to fit the axle, which device is provided with adjustable yielding means for retaining the absorbent material in proper position and for compressing it toward the axle.

This device further is to be preferably used in connection with a cover cap of greater interior diameter than the greatest diameter of the device.

With these and other objects in view, my invention consists in the construction, arrangement and combination of the various parts of my device whereby the objects contemplated are attained, as hereinafter more fully set forth, pointed out in my claim, and illustrated in the accompanying drawings, in which:

Figure 1 shows a top or plan view of a lubricant retainer embodying my invention.

Fig. 2 is a side elevation of the same, parts being broken away.

Fig. 3 shows a vertical, central, longitudinal, sectional view through the axle housing and bearing casing and through my improved lubricant retainer, and Fig. 4 shows a horizontal, sectional view through the packing ring.

In the accompanying drawings, I have used the reference numeral 10 to indicate generally the axle or shaft on which my improved lubricant retainer is used. For convenience of illustration I have shown my device installed on an axle of the type employed in Ford automobiles. The axle 10 is mounted in a housing 11. Inside the housing 11 is a roller bearing casing 12, which projects beyond the housing as shown in Fig. 3. The outer end of the bearing casing 12 is externally screw threaded to receive a cap 13. Mounted in the casing 12 and surrounding the shaft 10 are roller bearings 14. Within the casing 12 at the end thereof and adjacent to the ends of the bearings 14 is a suitable disk 15 having a central opening, which receives the axle 10 and having a plurality of smaller openings 16. The cap 13 has a central opening 17 of greater diameter than the axle 10, said cap 13 is so arranged that there is a space between the central opening of the cap and the disk or washer 15 in the end of the casing 12. Mounted within said space is my improved lubricant retainer. The cap 13 may be driven on if desired instead of being screwed on.

My improved lubricant retainer comprises a pair of spaced disks 18, which are screwed together at their peripheries by space connecting members 19. The disks 18 are formed with central openings 20, which register with each other and are of greater diameter than the axle 10. The disks 18 are preferably of somewhat less total diameter than the greatest interior diameter of the cap 13. Received between the disks is a packing ring 21 of suitable absorbent material, such for instance as felt or the like, having a central opening 22 adapted to fit the axle 10. The packing ring 21 is compressed between the disks 18 and its periphery is retained and held by means of a broken ring comprising segments 23 of spring metal having at their ends downward extensions or flanges 24. The spring metal segments 23 are spaced from each other around the packing ring and are adjustably connected together by means of bolts 25 extended through the adjacent flanges 24 by the segments 23. On the bolts 25 are nuts 26, which may be adjusted for more or less tightly compressing the packing ring against the axle and taking up the amount for wear and the like. The parts are removable by moving the cap 13 and placing my improved lubricant retainer on the axle as illustrated in Fig. 3 and then screwing on the cap.

It is well known that in the use of an axle of this kind lubricant tends to fall along the axle toward the end thereof and to be wasted and lost and also to be thrown upon the other parts of the machine. Where my improved lubricant retainer is employed the lubricant is held on the axle by means of the absorbent packing ring 21.

It is also known that in the use of an axle of this kind particularly on a motor vehicle, the axle tends to jump up and down somewhat with relation to the parts adjacent thereto and is subjected to constant vibration particularly vertical vibration, so that a metal packing ring fitting closely on the axle is not desirable. I have, therefore, formed my device in such a manner that the packing ring 21 fits closely on the axle while I have formed a holder consisting of the disks 18 with central openings of greater diameter than the axle, so that the metal of the holder need not be in constant contact with the axle. It thus appears that vibration of the axle particularly vertical vibration may occur and will be transmitted to the absorbent packing ring but will not cause contact or friction or impact between the axle and the disks 18.

It is desirable in a device of this kind that the central opening of the packing ring should be made to fit snugly on the axle and for this reason it is desirable that a means be provided for contracting the packing ring after a certain amount of wear has taken place. For the purpose of contracting the packing ring and pressing inwardly against the axle I have provided the bolts 25. By screwing nuts 26 farther onto the bolts 25 the packing ring may be compressed and pressed inwardly toward the axle. The arrangement of the parts is such that some play of the disks 18 is permitted after bringing the peripheries of said disks into contact with the cap 13 and after bringing the inner edges of said disks into contact with the axle. I preferably mount oustide the lubricant retainer but within the cap 13 a suitable washer 27.

It will be noted that the packing ring 21 is of less total diameter than the disks 18 so that the adjustable means for holding the packing rings pressed into the disks may be located between the disks 18 and within their outlines.

Some changes may be made in the construction and arrangement of the parts of my improved lubricant retainer without departing from the essential features and purposes of my invention and it is my purpose to cover by my claims any such modified forms of structure or use of mechanical equivalents as may be reasonably included within their scope.

I claim as my invention:

A lubricant retainer comprising a holder having spaced connected walls having concentric openings of greater diameter than the shaft on which the retainer is to be mounted, a packing ring within said holder having a central opening of smaller diameter than the openings in said holder, means for engaging the periphery of the packing ring, comprising a plurality of curved resilient strips, having at their ends outward extensions, a plurality of bolts extended through the extensions of the adjacent strips, and nuts adjustably mounted on said bolts, whereby the packing ring may move with relation to said means, and said means may be adjusted at different points on the periphery of the packing ring for imparting inward pressure thereto.

Des Moines, Iowa, September 14, 1917.

WILLIAM S. GRIGG.